United States Patent [19]

Ohmura et al.

[11] 4,361,654
[45] Nov. 30, 1982

[54] PORCELAIN ENAMEL FRIT FOR SHEET IRON GROUND COAT

[75] Inventors: Akira Ohmura, Kasugai; Tadashi Nakano, Aichi, both of Japan

[73] Assignee: NGK Insulators, Ltd., Nagoya, Japan

[21] Appl. No.: 290,182

[22] Filed: Aug. 5, 1981

[30] Foreign Application Priority Data

Sep. 29, 1980 [JP] Japan ............... 55-134213

[51] Int. Cl.$^3$ .................... C03C 7/02; C03C 3/08
[52] U.S. Cl. .................... 501/21; 501/24; 501/26; 501/63; 501/66; 501/67; 501/77; 501/79
[58] Field of Search ............. 501/21, 24, 26, 65, 501/63, 66, 67, 77, 79

[56] References Cited

U.S. PATENT DOCUMENTS

| | | | |
|---|---|---|---|
| 2,604,410 | 7/1952 | Bryant | 501/21 |
| 2,662,020 | 12/1953 | Schofield et al. | 501/21 |
| 2,753,271 | 7/1956 | Trepton | 501/21 |
| 2,757,105 | 7/1956 | Terry | 501/21 |
| 3,507,687 | 4/1970 | Laird | 501/21 |
| 3,556,820 | 1/1971 | Ruban et al. | 501/21 |
| 4,250,215 | 2/1981 | Mayer | 501/21 |

*Primary Examiner*—Mark Bell
*Attorney, Agent, or Firm*—Stevens, Davis, Miller & Mosher

[57] ABSTRACT

A porcelain enamel frit for sheet iron ground coat is disclosed, which contains neither fluorine nor fluorine compound, but has excellent firing property, and can be worked into sheet iron enamel having high gloss and adherence and low surface roughness. The frit consists of 100 parts of a main component and 7–42 parts of an auxiliary component, said main component consisting of 30–73 parts of $SiO_2$ or a mixture of $SiO_2$ and at least one of $TiO_2$, $ZrO_2$ and $SnO_2$, 8–45 parts of $B_2O_3$, and 8–41 parts of $Na_2O$ or a mixture of $Na_2O$ and at least one of $Li_2O$ and $K_2O$, and said auxiliary component consisting of not more than 12 parts of $Al_2O_3$, 1–22 parts of at least one of CaO, BaO, ZnO, MgO and SrO, from more than 0 part to 7 parts of $MoO_3$ or a mixture of $MoO_3$ and at least one of $V_2O_5$, $P_2O_5$ and $Sb_2O_3$, and 0.5–10 parts of at least one of CoO, NiO, CuO, $MnO_2$ and $Fe_2O_3$.

2 Claims, No Drawings

PORCELAIN ENAMEL FRIT FOR SHEET IRON GROUND COAT

BACKGROUND OF THE INVENTION (1) Field of the Invention

The present invention relates to a porcelain enamel frit for sheet iron ground coat which does not contain fluorine or a fluorine compound.

(2) Description of the Prior Art

Conventional porcelain enamel frits for sheet iron ground very often contain fluorine and fluorine compounds. The reason is as follows. Fluorine or fluorine compounds act as a flux in the production of porcelain enamel frit for sheet iron ground coat to promote the smelting of the raw material mixture, they act as a low melting point compound to lower the firing temperature at the firing for enameling, and they act to give a good gloss to the resulting porcelain enamel. However, fluorine or fluorine compounds are very toxic and volatilize in air from frit during the frit making and the firing for enameling. Therefore the use of porcelain enamel frit containing fluorine or fluorine compound is not preferable in view of public nuisance.

SUMMARY OF THE INVENTION

The object of the present invention is to provide an excellent porcelain enamel frit for sheet iron ground coat which does not contain fluorine or fluorine compounds, but which is equal to a or superior to a conventional fluorine- or fluorine compound-containing porcelain enamel frit for sheet iron ground coat with respect to smelting properties of the frit, low-temperature firing property in enameling, and in the resulting gloss of the porcelain enamel.

The present invention consists of a porcelain enamel frit for sheet iron ground coat, consisting of, in parts by weight, 100 parts of a main component consisting of 30–73 parts of $SiO_2$ or a mixture of $SiO_2$ and at least one of $TiO_2$, $ZrO_2$ and $SnO_2$, 8–45 parts of $B_2O_3$, and 8–41 parts of $Na_2O$ or a mixture of $Na_2O$ and at least one of $Li_2O$ and $K_2O$ (provided that, when the total amount of the mixture of $Na_2O$ and at least one of $Li_2O$ and $K_2O$ is assumed to be 100% by weight, the amount of $Na_2O$ is at least 45% by weight, that of $Li_2O$ is not more than 25% by weight, and that of $K_2O$ is not more than 50% by weight), and 7–42 parts of an auxiliary component consisting of not more than 12 parts of $Al_2O_3$, 1–22 parts of at least one of CaO, BaO, ZnO, MgO and SrO (provided that the amount of each oxide is not more than 12 parts), from more than 0 part to 7 parts of $MoO_3$ or a mixture of $MoO_3$ and at least one of $V_2O_5$, $P_2O_5$ and $Sb_2O_3$, and 0.5–10 parts of at least one of CoO, NiO, CuO, $MnO_2$ and $Fe_2O_3$.

The present invention is based on the discovery that a porcelain enamel frit consisting of a main component and an auxiliary component in a specifically limited mixing ratio, said main component consisting of (1) a given amount of $SiO_2$ or a mixture of $SiO_2$ and at least one of $TiO_2$, $ZrO_2$ and $SnO_2$, (2) a given amount of $B_2O_3$, and (3) a given amount of $Na_2O$ or a mixture of $Na_2O$ and at least one of $Li_2O$ and $K_2O$, and said auxiliary component consisting of (4) not more than a given amount of $Al_2O_3$, (5) a given amount of at least one of CaO, BaO, ZnO, MgO and SrO, (6) a given amount of $MoO_3$ or a mixture of $MoO_3$ and at least one of $V_2O_5$, $P_2O_5$ and $Sb_2O_3$, and (7) a given amount of at least one of CoO, NiO, CuO, $MnO_2$ and $Fe_2O_3$, has excellent smelting properties, low-temperature firing properties for use in enameling, gloss of the resulting porcelain enamel, and other properties as described above due to the synergistic effect of the main component and auxiliary component contained in the frit in a specifically limited mixing ratio, particularly due to the presence of $MoO_3$, $Na_2O$ and the like contained in the frit as essential components. This result is achieved in spite of the fact that the frit does not contain fluorine or a fluorine compound.

DESCRIPTION OF THE PREFERRED EMBODIMENT

The present invention will be explained in more detail.

It is necessary that the main component of the porcelain enamel frit of the present invention contains 30–73 parts (hereinafter "parts" mean parts by weight), preferably 35–66 parts, of $SiO_2$ or a mixture of $SiO_2$ and at least one of $TiO_2$, $ZrO_2$ and $SnO_2$; 8–45 parts, preferably 12–39 parts, of $B_2O_3$; 8–41 parts of $Na_2O$ or a mixture of $Na_2O$ and at least one of $Li_2O$ and $K_2O$, or preferably 13–35 parts of a mixture of $Na_2O$ and $LiO_2$, or a mixture of $Na_2O$, $Li_2O$ and $K_2O$.

$SiO_2$ or a mixture of $SiO_2$ and at least one of $TiO_2$, $ZrO_2$ and $SnO_2$ is a basic component of the frit of the present invention. When the amount of $SiO_2$ or a mixture of $SiO_2$ and at least one of $TiO_2$, $ZrO_2$ and $SnO_2$ contained in a frit exceeds 73 parts, the frit has a high smelting temperature, a high firing temperature is required, and therefore the production of glossy flat porcelain enamel is difficult. However, when the amount of $SiO_2$ or the mixture of $SiO_2$ contained in a frit is less than 30 parts, the frit is not chemically stable.

When the amount of $B_2O_3$ contained in a frit is less than 8 parts, a high firing temperature is required. While, when the amount of $B_2O_3$ contained in a frit exceeds 45 parts, the frit is not chemically stable.

When the amount of $Na_2O$ or a mixture of $Na_2O$ and at least one of $Li_2O$ and $K_2O$ contained in a frit is less than 8 parts, a very high firing temperature is required, and the thermal expansion coefficient of the resulting porcelain enamel coating is too low, therefore, when a sheet iron enamel is produced, the porcelain enamel coating is deformed in a large amount. However, when a frit contains more than 41 parts of $Na_2O$ or a mixture of $Na_2O$ and at least one of $Li_2O$ and $K_2O$, the frit is not chemically stable, the resulting porcelain enamel coating has a thermal expansion coefficient extremely higher than that of sheet iron, and the crazing of the porcelain enamel coating occurs. Further, in the above described mixture of $Na_2O$, $Li_2O$ and $K_2O$, the amount of each of $Na_2O$, $Li_2O$ and $K_2O$ must be such that, when the total amount of a mixture of $Na_2O$ and at least one of $Li_2O$ and $K_2O$ is assumed to be 100% by weight, the amount of $Na_2O$ is at least 45% by weight, preferably at least 55% by weight, the amount of $Li_2O$ is not more than 25% by weight, preferably from more than 0% by weight and not more than 16% by weight, and the amount of $K_2O$ is not more than 50% by weight, preferably not more than 40% by weight. This limitation is based on the reason that, when a mixture of $SiO_2$ and at least one of $Li_2O$ and $K_2O$ contains less than 45% by weight of $Na_2O$, more than 50% by weight of $K_2O$, or more than 25% by weight of $Li_2O$, a high firing temperature is required, and the appearance of the resulting porcelain enamel is poor.

Further, it is necessary that the porcelain enamel frit for sheet iron ground coat of the present invention contains the following auxiliary components. That is, it is necessary that the frit contains not more than 12 parts, preferably 3–10 parts, of $Al_2O_3$ as one of the auxiliary components in order to widen the firing range in enameling and to improve the mechanical strength of the resulting porcelain enamel. However, when a frit contains more than 12 parts of $Al_2O_3$, the smelting temperature of the frit is high, a high firing temperature is required, and the resulting porcelain enamel will have a poor gloss. Therefore, the use of more than 12 parts of $Al_2O_3$ is not preferable. When a frit contains 1–22 parts, preferably 2–18 parts, of at least one of CaO, BaO, ZnO, MgO and SrO, a porcelain enamel can be formed within a wide firing range without causing burning off. Therefore, a frit containing 1–22 parts of at least one of CaO, BaO, ZnO, MgO and SrO is preferably used. When the amount of at least one of CaO, BaO, ZnO, MgO and SrO is less than 1 part, the firing range is narrow, and further, the burning off is apt to occur at the enameling. When the amount of at least one of CaO, BaO, ZnO, MgO and SrO exceeds 22 parts, the resulting porcelain enamel has a poor appearance. In this case, the amount of each of CaO, BaO, ZnO, MgO and SrO must be not more than 12 parts. The reason is that, when a frit contains more than 12 parts of each of these oxides, a high firing temperature is required, and the resulting porcelain enamel has a poor appearance.

Further, it is very important that the porcelain enamel frit contains from more than 0 part to 7 parts, preferably to 5 parts, of $MoO_3$ or a mixture of $MoO_3$ and at least one of $V_2O_5$, $P_2O_5$ and $Sb_2O_3$ in order to lower the surface energy of the resulting porcelain enamel and to form a porcelain enamel coating having a flat surface with an improved gloss. However, when a frit contains more than 7 parts of $MoO_3$ or a mixture of $MoO_3$ and at least one of $V_2O_5$, $P_2O_5$ and $Sb_2O_3$, the firing range is narrow and the resulting porcelain enamel is poor in appearance, and the use of more than 7 parts of $MoO_3$ or a mixture of $MoO_3$ and at least one of $V_2O_5$, $P_2O_5$ and $Sb_2O_3$ is thus not preferable. Further, $MoO_3$ must be contained in a frit as an essential component. Since $MoO_3$ is an indispensable component for lowering the firing temperature and for improving the appearance, particularly the gloss and flatness, of the resulting porcelain enamel coating.

Further, the frit of the present invention must contain 0.5–10 parts, preferably 1–7 parts, of at least one of CoO, NiO, CuO, $MnO_2$ and $Fe_2O_3$. These oxides are essential components for forming a porcelain enamel coating adhered tightly to a sheet iron. When the amount of at least one of CoO, NiO, CuO, $MnO_2$ and $Fe_2O_3$ is less than 0.5 part, the effect of these oxides does not fully appear, and the resulting porcelain enamel coating chips from the sheet iron. On the other hand when the amount of these oxides exceeds 10 parts, the resulting porcelain enamel is poor in appearance. Therefore, the use of less than 0.5 part or more than 10 parts of these oxides is not preferable.

The amount of the auxiliary component must be 7–42 parts, preferably 11–37 parts, based on 100 parts of the main component. The main component is a basic component of a frit, that is, an essential component for a frit to be formed into a vitreous enamel. However, a frit consisting solely of the main component does not have necessary properties which are sufficiently excellent so that the frit may be formed into enamel. That is, the frit cannot be fired at a temperature of not higher than about 900° C. (The firing temperature for producing sheet iron enamel must not be higher than about 900° C.), is narrow in the firing temperature range used in enameling, and the resulting sheet iron enamel is poor in appearance and in the adherence of the enamel coating to the sheet iron. Therefore, a frit must contain a given amount of 7–42 parts of the auxiliary component based on 100 parts of the main component. When a frit contains more than 42 parts of an auxiliary component, the frit is not chemically stable and the resulting porcelain enamel is poor in appearance. While, when a frit contains less than 7 parts of an auxiliary component, a high firing temperature is required, and the firing range in enameling is narrow. Therefore, the use of less than 7 parts or more than 42 parts of the auxiliary component based on 100 parts of the main component is not preferable.

A method for producing the porcelain enamel frit for sheet iron ground coat of the present invention and a method for producing sheet iron enamel by the use of the porcelain enamel frit will be explained hereinafter. That is, raw material components for a porcelain enamel frit for sheet iron ground coat of the present invention were weighed and mixed in such a mixing ratio that the resulting frit would have a given composition; the resulting raw material mixture was smelted at a temperature of 1,100°–1,250° C. for about 1 hour to decompose the raw material and to form a homogeneous smelted mixture; the smelted mixture was poured into water to quench the mixture; and the quenched mixture was dried to obtain a porcelain enamel frit of the present invention. A sheet iron enamel can be produced by using the above obtained porcelain enamel frit in the same method as the method of producing conventional sheet iron enamel. That is, the frit was subjected to a mill addition according to the compounding recipe shown in the following Table 1, and the resulting mixture is ground by means of a ball mill or the like to produce a slip.

TABLE 1

|  | Amount (parts by weight) |
| --- | --- |
| Frit | 100 |
| Clay | 4–8 |
| Quartz | 0–15 |
| Borax (hydrated) | 0–1 |
| Sodium nitrite | 0.1–0.5 |
| Water | 40–50 |

Then, the slip was applied onto a sheet iron, which had previously been subjected to conventional pretreatments, by means of a spray gun or the like, in an amount such that an enamel coating having a thickness of about 70–90 μm would be formed on the sheet iron surface after firing, dried, and then fired at a temperature of 700°–880° C. for about 1–4 minutes to obtain a sheet iron enamel.

Then, the porcelain enamel frit for sheet iron ground coat of the present invention will be explained by the following example. Raw material components for a porcelain enamel frit were weighed and mixed in such a mixing ratio that the resulting frit would have a given composition shown in the following Table 3, the resulting mixture was smelted at a temperature of 1,200° C.

for 1 hour, and the smelted mixture was poured into water to obtain a porcelain enamel frit of the present invention. The resulting frit was subjected to a mill addition according to the compounding recipe shown in the following Table 2 to produce a slip. The slip was applied onto a sheet iron having a thickness of 0.8 mm and a dimension of 10×10 cm in an amount such that an enamel coating having a thickness of 70 μm would be formed on the sheet iron surface after firing, and fired for 3 minutes at a temperature described in Table 3 to obtain sheet iron enamels of sample Nos. 1-60.

TABLE 2

|  | Amount (parts by weight) |
|---|---|
| Frit | 100 |
| Clay | 6 |
| Quartz | 5 |
| Borax (hydrated) | 0.5 |
| Sodium nitrite | 0.2 |
| Water | 45 |

For comparison, reference sheet iron enamels of sample Nos. 61-68 and conventional sheet iron enamels of samples Nos. 69-72 were produced. The resulting sheet iron enamels were compared with each other with respect to gloss, flatness and adherence. The results are obtained shown in Table 3. The gloss was measured at an angle of incidence of 60° by means of a digital glossimeter CM-3D made by Murakami Color Technical Laboratory Inc., and was shown by an average value of 5 measured values. The surface roughness was shown by the 10 point average roughness of the surface roughness testing method in JIS B0601, wherein 2.5 mm was used as a standard length. The adherence was measured according to the testing method for adherence defined in ASTM C313, and was indicated by the adherence index (%).

TABLE 3(a)

| No. | Main component (parts by weight) | | | | | | | | | Auxiliary component (parts by weight) | | | | | |
|---|---|---|---|---|---|---|---|---|---|---|---|---|---|---|---|
|  | $SiO_2$ | $TiO_2$ | $ZrO_2$ | $SnO_2$ | $B_2O_3$ | $Li_2O$ | $K_2O$ | $Na_2O$ | Total | $Al_2O_3$ | CaO | BaO | ZnO | MgO | SrO |
|  | Porcelain enamel frit of the present invention | | | | | | | | | | | | | | |
| 1 | 53.5 | 1.2 | — | 3.7 | 21.3 | 2.2 | 3.0 | 15.1 | 100.0 | 3.7 | 8.1 | — | 2.0 | 2.0 | 2.0 |
| 2 | 35.0 | 1.8 | 1.8 | — | 29.0 | 6.8 | 10.0 | 15.6 | 100.0 | 4.2 | 7.7 | — | 2.0 | 4.7 | — |
| 3 | 62.0 | — | — | 1.2 | 19.2 | 0.5 | 4.4 | 12.7 | 100.0 | 8.4 | 8.8 | 3.3 | 4.3 | — | — |
| 4 | 36.5 | — | — | — | 33.6 | 3.0 | 3.0 | 23.9 | 100.0 | 6.4 | 7.3 | 4.5 | — | 4.7 | — |
| 5 | 50.0 | — | — | — | 15.0 | 1.0 | 6.7 | 27.3 | 100.0 | 8.4 | 2.0 | — | 7.8 | — | — |
| 6 | 42.7 | — | 6.0 | — | 21.1 | 5.4 | 1.8 | 23.0 | 100.0 | 8.2 | 2.0 | — | 6.7 | — | — |
| 7 | 56.1 | — | — | — | 16.8 | 0.8 | 6.8 | 19.5 | 100.0 | 4.2 | 3.7 | 9.2 | — | — | 2.0 |
| 8 | 45.2 | — | — | — | 29.1 | 2.6 | 5.1 | 18.0 | 100.0 | 4.0 | 4.5 | 2.5 | 2.0 | 2.0 | — |
| 9 | 40.8 | — | — | — | 32.5 | 2.1 | 5.3 | 19.3 | 100.0 | 4.0 | 6.5 | — | 6.5 | — | — |
| 10 | 62.7 | — | — | — | 14.8 | 2.2 | 2.2 | 18.1 | 100.0 | 3.5 | 2.0 | 8.0 | 5.0 | 3.2 | — |
| 11 | 60.0 | 4.1 | — | — | 15.8 | 2.2 | 3.0 | 14.9 | 100.0 | 7.5 | 7.3 | 3.0 | 2.5 | — | 1.3 |
| 12 | 40.0 | — | 5.0 | — | 34.7 | 0.6 | 6.1 | 13.6 | 100.0 | 6.5 | 2.5 | — | 8.3 | 3.1 | — |
| 13 | 40.0 | 3.2 | — | — | 31.1 | 2.3 | 1.3 | 22.1 | 100.0 | 6.5 | — | 7.5 | 2.9 | 1.0 | — |
| 14 | 40.0 | — | — | 0.8 | 32.5 | 6.1 | 5.1 | 15.5 | 100.0 | 2.0 | 6.2 | — | — | — | — |
| 15 | 43.0 | — | — | — | 24.0 | 1.0 | 9.9 | 22.1 | 100.0 | 5.4 | 4.5 | — | 2.3 | 4.5 | — |
| 16 | 58.4 | — | — | — | 21.3 | 1.0 | 9.5 | 9.8 | 100.0 | 2.0 | 9.1 | 6.0 | — | — | — |
| 17 | 50.0 | 1.3 | 6.0 | — | 27.4 | 0.3 | 4.4 | 10.6 | 100.0 | 9.3 | 8.1 | — | 2.0 | — | — |
| 18 | 57.3 | — | — | — | 27.4 | 1.1 | 2.0 | 12.2 | 100.0 | 5.6 | 9.2 | 1.0 | — | — | — |
| 19 | 34.7 | — | — | — | 39.9 | 3.8 | — | 21.6 | 100.0 | 1.7 | 7.7 | 6.0 | — | 2.0 | — |
| 20 | 48.7 | — | — | — | 21.1 | 0.6 | 3.6 | 26.0 | 100.0 | 6.5 | 4.5 | 4.5 | — | — | — |
| 21 | 54.1 | — | 2.0 | — | 16.8 | 0.5 | 3.0 | 23.6 | 100.0 | 3.9 | 2.0 | 6.0 | 1.0 | — | — |
| 22 | 45.0 | — | 13.2 | — | 19.8 | 2.6 | 5.5 | 13.9 | 100.0 | 5.0 | 4.2 | — | — | — | — |
| 23 | 40.0 | — | 5.0 | — | 34.7 | 2.4 | 6.9 | 11.0 | 100.0 | 8.4 | 9.2 | — | — | — | 3.7 |
| 24 | 37.2 | — | 2.8 | — | 23.6 | 3.6 | 3.6 | 29.2 | 100.0 | 6.5 | 8.8 | — | — | — | — |
| 25 | 57.3 | — | — | — | 27.4 | 2.3 | — | 13.0 | 100.0 | 3.8 | 2.3 | 6.0 | 5.0 | — | — |
| 26 | 45.3 | — | 7.3 | — | 26.0 | 1.7 | — | 19.7 | 100.0 | 5.7 | 8.9 | — | — | 7.0 | — |
| 27 | 31.8 | — | — | — | 34.2 | 0.7 | 1.0 | 32.3 | 100.0 | 11.5 | 6.5 | 2.0 | 2.0 | — | 1.0 |
| 28 | 47.2 | — | — | — | 36.0 | 2.5 | — | 14.3 | 100.0 | 9.5 | 2.5 | 7.9 | — | — | — |
| 29 | 46.4 | — | — | — | 27.6 | 0.3 | 3.3 | 22.4 | 100.0 | 3.8 | 7.7 | 4.7 | — | — | 2.1 |
| 30 | 40.0 | — | — | — | 23.6 | 7.6 | 11.3 | 17.5 | 100.0 | 6.5 | 2.0 | 4.7 | — | — | 1.0 |
| 31 | 64.5 | — | — | — | 20.0 | 1.4 | 0.8 | 13.3 | 100.0 | 4.4 | 4.2 | 11.3 | — | 3.0 | — |
| 32 | 64.0 | 1.2 | — | — | 17.2 | 3.9 | 1.2 | 12.5 | 100.0 | — | 2.5 | 3.0 | — | — | — |
| 33 | 45.2 | — | — | — | 31.7 | 3.5 | — | 19.6 | 100.0 | 9.5 | 4.9 | 2.0 | 1.0 | 2.0 | — |
| 34 | 38.6 | — | — | — | 29.0 | 0.6 | 2.6 | 29.2 | 100.0 | 5.0 | 3.8 | 6.9 | 2.2 | — | — |
| 35 | 36.5 | — | — | — | 33.6 | 0.9 | 7.5 | 21.5 | 100.0 | 9.5 | 3.8 | 2.5 | 2.3 | — | 4.0 |
| 36 | 60.0 | 0.7 | 0.5 | 1.5 | 14.8 | 2.5 | 7.0 | 13.0 | 100.0 | 7.5 | 4.5 | 2.0 | — | — | 5.9 |
| 37 | 56.1 | — | — | — | 16.8 | 2.4 | 1.4 | 23.3 | 100.0 | 8.2 | 4.3 | 2.5 | 2.5 | — | — |
| 38 | 65.0 | — | — | — | 14.6 | 2.4 | 7.0 | 11.0 | 100.0 | 4.2 | 2.7 | 2.0 | 2.0 | — | — |
| 39 | 63.2 | 1.0 | 1.0 | — | 17.2 | 0.7 | 2.5 | 14.4 | 100.0 | 4.2 | 4.5 | 3.0 | 1.5 | — | — |
| 40 | 40.0 | — | — | 0.8 | 32.5 | 0.5 | 9.3 | 16.9 | 100.0 | 5.4 | 2.5 | 6.0 | 6.0 | — | — |
| 41 | 50.0 | — | — | — | 24.0 | 1.0 | 3.6 | 21.4 | 100.0 | 4.0 | 2.5 | 2.5 | — | — | — |
| 42 | 31.8 | — | — | — | 34.2 | — | 2.4 | 31.6 | 100.0 | 2.0 | — | — | 5.2 | — | — |
| 43 | 45.2 | 1.5 | 2.0 | — | 21.1 | 3.0 | 3.0 | 24.2 | 100.0 | 10.0 | 3.2 | — | — | — | 0.8 |
| 44 | 48.2 | 1.8 | — | — | 15.0 | 5.3 | — | 29.7 | 100.0 | 7.5 | 4.5 | — | 2.5 | — | — |
| 45 | 40.0 | 1.4 | 5.0 | — | 27.6 | 6.0 | 4.9 | 15.1 | 100.0 | 9.5 | 2.5 | — | — | 5.3 | — |
| 46 | 55.4 | 2.0 | 14.0 | — | 11.3 | 2.9 | 4.5 | 9.9 | 100.0 | 2.0 | 5.8 | — | 9.3 | — | 5.9 |
| 47 | 45.0 | — | — | — | 34.7 | 1.6 | — | 18.7 | 100.0 | 10.4 | 4.2 | 6.2 | 7.3 | — | — |
| 48 | 52.6 | — | — | — | 26.0 | 0.4 | 3.9 | 17.1 | 100.0 | 7.3 | 2.5 | 1.0 | 8.8 | — | — |
| 49 | 54.1 | 3.3 | 1.0 | — | 21.3 | 0.2 | 1.2 | 18.9 | 100.0 | 5.6 | 8.1 | — | — | — | 2.1 |
| 50 | 40.0 | — | — | — | 34.3 | 1.3 | 4.6 | 19.8 | 100.0 | 7.5 | 4.2 | 6.3 | 2.1 | — | — |

TABLE 3(a)-continued

| | Main component (parts by weight) | | | | | | | | | Auxiliary component (parts by weight) | | | | | |
|---|---|---|---|---|---|---|---|---|---|---|---|---|---|---|---|
| No. | $SiO_2$ | $TiO_2$ | $ZrO_2$ | $SnO_2$ | $B_2O_3$ | $Li_2O$ | $K_2O$ | $Na_2O$ | Total | $Al_2O_3$ | CaO | BaO | ZnO | MgO | SrO |
| 51 | 58.7 | — | 3.3 | — | 18.0 | 1.0 | 7.0 | 12.0 | 100.0 | 6.8 | 5.8 | 2.5 | 2.5 | 4.0 | — |
| 52 | 40.0 | 2.8 | — | — | 31.5 | — | 6.7 | 19.0 | 100.0 | 5.5 | 6.2 | 7.5 | 3.9 | 3.3 | — |
| 53 | 61.3 | — | — | — | 16.2 | 0.4 | 7.9 | 14.2 | 100.0 | 3.9 | 2.5 | — | 2.5 | — | — |
| 54 | 45.2 | — | 7.4 | — | 26.0 | 1.1 | 3.8 | 16.5 | 100.0 | 4.2 | 3.8 | 6.0 | — | — | — |
| 55 | 46.2 | — | — | 1.0 | 40.0 | 2.2 | 2.1 | 8.5 | 100.0 | 8.4 | — | 6.0 | 6.0 | — | — |
| 56 | 40.0 | 1.4 | 5.0 | — | 27.6 | 3.9 | 3.4 | 18.7 | 100.0 | 4.1 | 1.0 | 2.0 | 3.0 | — | — |
| 57 | 51.0 | — | — | — | 14.0 | 1.7 | 3.5 | 29.8 | 100.0 | 10.0 | 2.5 | 8.7 | — | 1.0 | — |
| 58 | 36.5 | — | — | — | 33.6 | 4.5 | 3.9 | 21.5 | 100.0 | 11.0 | 6.6 | 1.7 | 8.9 | — | — |
| 59 | 46.2 | — | — | 1.0 | 40.0 | — | 3.3 | 9.5 | 100.0 | 11.5 | 6.3 | 5.4 | — | — | 8.6 |
| 60 | 35.0 | 1.8 | 1.8 | — | 29.0 | 1.3 | 4.5 | 26.6 | 100.0 | 5.3 | 2.2 | 11.2 | — | — | — |
| | Reference porcelain enamel frit | | | | | | | | | | | | | | |
| 61 | 71.8 | 3.0 | — | — | 11.2 | 4.6 | 1.4 | 8.0 | 100.0 | 7.5 | 5.7 | 2.5 | 1.0 | — | — |
| 62 | 38.0 | 0.7 | — | — | 47.4 | 0.6 | 0.6 | 12.7 | 100.0 | 6.3 | 4.7 | 2.0 | 9.0 | 9.0 | — |
| 63 | 30.0 | — | 5.0 | — | 18.3 | 5.6 | 21.0 | 20.1 | 100.0 | 4.4 | 3.7 | 1.0 | — | — | — |
| 64 | 28.1 | — | — | — | 40.1 | 5.7 | 1.9 | 24.2 | 100.0 | 4.1 | 3.7 | 2.5 | 2.5 | 2.3 | — |
| 65 | 54.3 | 2.1 | 2.0 | — | 21.3 | 7.5 | 6.1 | 6.7 | 100.0 | 12.9 | 6.7 | 5.2 | 5.2 | 8.0 | — |
| 66 | 50.0 | 0.6 | — | 2.0 | 26.0 | 2.6 | 9.6 | 9.2 | 100.0 | 16.3 | 3.5 | 3.5 | 7.8 | — | — |
| 67 | 49.5 | 1.7 | 14.0 | — | 17.2 | 0.5 | 4.4 | 12.7 | 100.0 | 11.0 | 9.6 | 2.6 | 5.9 | — | 4.6 |
| 68 | 40.0 | — | — | — | 23.6 | 3.3 | 1.8 | 31.3 | 100.0 | 5.5 | 5.2 | 2.0 | 1.0 | — | — |
| | Conventional porcelain enamel frit | | | | | | | | | | | | | | |
| 69 | 48.7 | — | — | — | 21.1 | — | 2.1 | 28.1 | 100.0 | 12.5 | 6.9 | 1.7 | 3.0 | 1.0 | — |
| 70 | 46.4 | — | — | — | 27.6 | — | 15.6 | 10.4 | 100.0 | 9.5 | 8.5 | — | — | — | — |
| 71 | 36.5 | — | — | — | 33.6 | — | 1.5 | 28.4 | 100.0 | 7.2 | 7.3 | — | — | 0.5 | — |
| 72 | 58.1 | — | 8.4 | — | 20.0 | 2.0 | — | 11.5 | 100.0 | — | 3.5 | 6.2 | — | — | — |

TABLE 3(b)

| | Auxiliary component (parts by weight) | | | | | | | | | | | Firing temperature (°C.) | Gloss (%) | Surface roughness (μm) | Adherence (%) |
|---|---|---|---|---|---|---|---|---|---|---|---|---|---|---|---|
| No. | $MoO_3$ | $V_2O_5$ | $P_2O_5$ | $Sb_2O_3$ | CoO | NiO | CuO | $MnO_2$ | $Fe_2O_3$ | F | Total | | | | |
| | Porcelain enamel frit of the present invention | | | | | | | | | | | | | | |
| 1 | 0.8 | 0.7 | 0.5 | — | 1.0 | 0.3 | — | — | 0.1 | — | 21.2 | 800 | 86 | 2.0 | 83 |
| 2 | 0.8 | 3.5 | 2.0 | — | — | 1.5 | — | 0.5 | 0.5 | — | 27.4 | 720 | 80 | 1.5 | 85 |
| 3 | 1.6 | 0.3 | — | — | — | 2.5 | 1.0 | 0.5 | — | — | 30.7 | 840 | 83 | 2.1 | 80 |
| 4 | 1.8 | 0.2 | — | — | 0.5 | — | — | 2.5 | — | — | 27.9 | 760 | 83 | 1.9 | 80 |
| 5 | 0.3 | — | — | — | 0.3 | 1.1 | — | — | 0.7 | — | 20.6 | 780 | 80 | 2.0 | 91 |
| 6 | 0.5 | — | 2.0 | 1.0 | — | 1.0 | — | 0.3 | — | — | 21.7 | 800 | 75 | 2.0 | 82 |
| 7 | 3.0 | — | 0.5 | — | — | 1.6 | — | 0.3 | — | — | 24.5 | 780 | 87 | 1.9 | 86 |
| 8 | 0.8 | 0.8 | 1.0 | — | 0.6 | 2.0 | — | 0.4 | 0.2 | — | 20.8 | 760 | 82 | 1.7 | 90 |
| 9 | 0.2 | — | 0.6 | 0.5 | — | 0.9 | — | — | 0.3 | — | 19.5 | 760 | 82 | 2.4 | 85 |
| 10 | 0.3 | 2.0 | 0.2 | — | 0.3 | 0.6 | — | — | 0.3 | — | 25.4 | 840 | 78 | 2.4 | 83 |
| 11 | 0.5 | — | 1.0 | 1.5 | — | 0.6 | — | 1.5 | — | — | 26.7 | 860 | 83 | 2.5 | 82 |
| 12 | 0.1 | 0.3 | — | — | 0.9 | 0.3 | — | 1.6 | — | — | 23.6 | 760 | 80 | 2.2 | 87 |
| 13 | 0.5 | — | 0.6 | 0.6 | — | 1.5 | 0.5 | 4.5 | — | — | 26.1 | 750 | 84 | 1.8 | 92 |
| 14 | 0.7 | — | — | — | 0.9 | — | — | 0.2 | — | — | 10.0 | 750 | 82 | 2.3 | 84 |
| 15 | 1.5 | 1.5 | — | — | — | 1.5 | — | 4.1 | — | — | 25.3 | 730 | 85 | 1.6 | 87 |
| 16 | 0.4 | 3.9 | — | — | 1.0 | 0.3 | 0.5 | — | — | — | 23.2 | 820 | 77 | 1.9 | 85 |
| 17 | 2.8 | — | — | 1.0 | 0.5 | 0.3 | — | 0.5 | — | — | 24.5 | 820 | 86 | 1.9 | 82 |
| 18 | 1.6 | 0.3 | 0.3 | — | 0.6 | 0.6 | 0.3 | — | 0.1 | — | 19.6 | 820 | 84 | 2.0 | 86 |
| 19 | 1.0 | — | 0.5 | — | — | 0.6 | — | — | 0.2 | — | 19.7 | 720 | 75 | 2.4 | 75 |
| 20 | 2.5 | — | 0.5 | 0.5 | 0.9 | 1.0 | 0.3 | 0.5 | 0.2 | — | 21.9 | 770 | 85 | 1.5 | 90 |
| 21 | 0.8 | — | — | — | 0.7 | 0.5 | — | — | — | — | 14.9 | 820 | 84 | 1.6 | 88 |
| 22 | 2.7 | — | 1.1 | — | 1.2 | — | — | 1.0 | — | — | 15.2 | 850 | 82 | 2.5 | 84 |
| 23 | 1.8 | — | 2.0 | — | 0.5 | 0.3 | — | 2.0 | 0.9 | — | 28.8 | 750 | 77 | 2.9 | 84 |
| 24 | 0.5 | — | 0.3 | — | 1.0 | 0.5 | — | 2.0 | — | — | 19.6 | 760 | 80 | 2.4 | 88 |
| 25 | 0.2 | 0.3 | 0.5 | 0.5 | — | 1.2 | 0.3 | — | — | — | 20.1 | 830 | 80 | 2.0 | 83 |
| 26 | 0.1 | 2.0 | 2.0 | — | 1.6 | — | — | — | 0.2 | — | 27.5 | 810 | 80 | 2.5 | 90 |
| 27 | 0.1 | 0.5 | — | — | 0.3 | 0.3 | — | 0.3 | — | — | 24.5 | 710 | 76 | 2.4 | 82 |
| 28 | 1.6 | 0.4 | — | — | 1.7 | 0.3 | — | 0.4 | 0.5 | — | 24.8 | 780 | 82 | 2.0 | 90 |
| 29 | 0.5 | — | 0.6 | — | 1.0 | 1.0 | — | — | — | — | 21.4 | 760 | 81 | 1.6 | 85 |
| 30 | 3.0 | — | 0.3 | 0.5 | 0.5 | 0.5 | — | 0.4 | — | — | 19.4 | 740 | 83 | 1.6 | 85 |
| 31 | 1.5 | 0.5 | 0.5 | — | 0.5 | 1.1 | 0.3 | 0.2 | — | — | 27.5 | 860 | 83 | 2.4 | 86 |
| 32 | 1.5 | 0.5 | — | 0.3 | 0.5 | — | — | 1.0 | — | — | 9.3 | 860 | 75 | 1.8 | 82 |
| 33 | 3.0 | — | — | — | — | 1.6 | — | — | — | — | 24.0 | 700 | 85 | 2.4 | 82 |
| 34 | 3.5 | — | — | — | 0.6 | 0.9 | — | 1.9 | — | — | 24.8 | 750 | 82 | 2.3 | 92 |
| 35 | 1.5 | 1.6 | 0.3 | 2.9 | 1.0 | — | — | 0.3 | 0.1 | — | 29.8 | 750 | 79 | 1.5 | 85 |
| 36 | 1.8 | — | 0.6 | — | 0.6 | — | — | 1.0 | — | — | 23.9 | 820 | 83 | 2.0 | 82 |
| 37 | 0.4 | 3.1 | — | 0.5 | — | 2.0 | — | 1.1 | 1.1 | — | 25.7 | 800 | 81 | 1.8 | 84 |
| 38 | 0.8 | 2.0 | — | — | 0.5 | 0.7 | — | 0.3 | — | — | 15.2 | 840 | 80 | 3.0 | 82 |
| 39 | 4.6 | — | — | — | 0.3 | — | — | 0.9 | — | — | 19.0 | 840 | 86 | 2.3 | 76 |
| 40 | 3.3 | 0.2 | 0.1 | — | — | 1.5 | — | — | — | — | 25.0 | 730 | 87 | 1.9 | 78 |
| 41 | 0.5 | — | 1.0 | — | — | 0.8 | 0.2 | — | — | — | 11.5 | 740 | 81 | 2.4 | 86 |
| 42 | 0.5 | — | — | — | 0.5 | 0.3 | — | — | — | — | 8.5 | 720 | 79 | 2.4 | 76 |
| 43 | 0.8 | — | 0.5 | 0.5 | — | 1.9 | — | 0.8 | — | — | 18.5 | 780 | 86 | 2.0 | 86 |
| 44 | 1.8 | 0.2 | 0.6 | — | 0.7 | 1.1 | — | 4.5 | — | — | 23.4 | 760 | 80 | 1.6 | 91 |

TABLE 3(b)-continued

| No. | Auxiliary component (parts by weight) | | | | | | | | | | Total | Firing temperature (°C.) | Gloss (%) | Surface roughness (μm) | Adherence (%) |
|---|---|---|---|---|---|---|---|---|---|---|---|---|---|---|---|
| | MoO₃ | V₂O₅ | P₂O₅ | Sb₂O₃ | CoO | NiO | CuO | MnO₂ | Fe₂O₃ | F | | | | | |
| 45 | 2.7 | — | 0.6 | — | — | 1.0 | — | 1.0 | — | — | 22.6 | 760 | 78 | 1.7 | 80 |
| 46 | 0.2 | — | 1.0 | — | 0.9 | — | — | — | 0.5 | — | 25.6 | 850 | 77 | 3.6 | 77 |
| 47 | 3.0 | — | 1.0 | 0.5 | 0.7 | 0.5 | 2.0 | 3.0 | — | — | 38.8 | 740 | 76 | 1.8 | 90 |
| 48 | 0.8 | 1.0 | 1.0 | — | 1.0 | 0.3 | 0.3 | — | — | — | 24.0 | 780 | 84 | 1.7 | 88 |
| 49 | 0.4 | — | 1.0 | — | — | 1.2 | — | — | — | — | 18.4 | 830 | 80 | 2.4 | 84 |
| 50 | 1.0 | 0.5 | — | — | 1.0 | 0.5 | — | 0.4 | — | — | 23.5 | 730 | 86 | 1.8 | 90 |
| 51 | 0.5 | 1.5 | — | 0.5 | — | 1.7 | 0.2 | 0.5 | — | — | 26.5 | 860 | 80 | 2.0 | 85 |
| 52 | 3.3 | 1.5 | — | — | — | 1.0 | — | 2.5 | — | — | 34.7 | 740 | 79 | 2.5 | 84 |
| 53 | 0.8 | — | — | — | — | 2.1 | 0.3 | 0.5 | — | — | 12.6 | 850 | 81 | 2.4 | 83 |
| 54 | 4.7 | 0.2 | — | 1.0 | — | 0.9 | — | 1.0 | 0.2 | — | 22.0 | 800 | 78 | 2.2 | 80 |
| 55 | 3.7 | — | — | — | — | 2.0 | — | — | 0.7 | — | 26.8 | 780 | 80 | 2.0 | 83 |
| 56 | 0.5 | — | — | 1.2 | — | 1.5 | — | — | — | — | 13.3 | 770 | 81 | 2.0 | 85 |
| 57 | 4.0 | 0.5 | — | — | — | 0.8 | — | 0.5 | — | — | 28.0 | 750 | 83 | 1.5 | 81 |
| 58 | 0.2 | 0.5 | 0.3 | — | — | 1.5 | 0.5 | 3.0 | — | — | 34.2 | 740 | 80 | 1.8 | 90 |
| 59 | 1.8 | 0.7 | 1.0 | — | 0.3 | 2.0 | 0.5 | 1.7 | — | — | 39.8 | 790 | 76 | 2.3 | 89 |
| 60 | 1.7 | 0.2 | — | — | 0.5 | 0.5 | 1.0 | 2.3 | — | — | 24.9 | 730 | 84 | 1.6 | 91 |
| | Reference porcelain enamel frit | | | | | | | | | | | | | | |
| 61 | — | 1.5 | 0.3 | — | 0.5 | 0.6 | — | 0.5 | — | — | 20.1 | 880 | 68 | 6.5 | 80 |
| 62 | — | — | — | — | 0.3 | 1.0 | 0.2 | 1.0 | — | — | 33.5 | 790 | 70 | 2.2 | 78 |
| 63 | — | 0.5 | 0.3 | — | 0.2 | 1.5 | — | — | 0.3 | — | 11.9 | 700 | (crazing) | | |
| 64 | — | — | — | — | — | 0.5 | — | 0.1 | — | — | 15.7 | (firing is impossible) | | | |
| 65 | — | — | — | — | 0.2 | — | — | 5.0 | — | — | 43.2 | 840 | 65 | 5.2 | 82 |
| 66 | — | — | — | 0.5 | 0.3 | 0.5 | — | — | — | — | 32.4 | 860 | 67 | 3.4 | 72 |
| 67 | — | — | 0.6 | — | — | 0.2 | 0.5 | 4.1 | — | — | 39.1 | 850 | 70 | 2.5 | 79 |
| 68 | — | — | — | — | 0.3 | — | — | — | — | — | 14.0 | 740 | 68 | 2.0 | 63 |
| | Conventional porcelain enamel frit | | | | | | | | | | | | | | |
| 69 | — | — | — | — | 0.3 | 1.5 | — | — | — | 2.5 | 29.4 | 770 | 82 | 2.2 | 85 |
| 70 | — | — | — | — | 1.0 | 2.0 | — | — | — | 4.1 | 25.1 | 760 | 69 | 1.8 | 87 |
| 71 | — | — | 0.5 | — | — | 1.3 | 0.2 | 2.0 | 0.2 | 3.3 | 22.5 | 740 | 81 | 1.9 | 85 |
| 72 | — | — | — | — | 1.0 | 0.3 | — | 1.0 | — | 2.0 | 14.0 | 850 | 80 | 2.5 | 83 |

It can be seen from Table 3 that the sheet iron enamel produced by the use of the porcelain enamel frit of the present invention is equal to, or superior to, sheet iron enamels produced by the use of conventional procelain enamel frit containing fluorine or a fluorine compound, in gloss, flatness and adherence.

In general, porcelain enamel frits for sheet iron ground coat are often used in the form of a mixture of several frits. In this case, frits having different firing temperatures are generally mixed. Of course, the porcelain enamel frits of the present invention can be used in the form of a mixture.

As described above, the porcelain enamel frit for sheet iron ground coat according to the present invention does not contain any harmful fluorine or fluorine compound, but has smelting properties, low-temperature firing properties, gloss, flatness and adherence equal to or superior to those of conventional porcelain enamel frit which contains fluorine or a fluorine compound. This result is due to the synergistic effect of the components contained in the frit, particularly due to the specifically limited amounts of $MoO_3$, $Li_2O$ and $Na_2O$ contained in the frit. Therefore, the porcelain enamel frit of the present invention may be used very advantageously as a porcelain enamel frit for sheet iron ground coat without toxicity due to fluorine or fluorine compounds.

What is claimed is:

1. A fluorine or fluorine compound free porcelain enamel frit for sheet iron ground coat, consisting of, in parts by weight,
    100 parts of a main component consisting of 30–73 parts of $SiO_2$ or a mixture of $SiO_2$ and at least one of $TiO_2$, $ZrO_2$ and $SnO_2$, 8–45 parts of $B_2O_3$, and 8–41 parts of $Na_2O$ or a mixture of $Na_2O$ and at least one of $Li_2O$ and $K_2O$ (provided that, when the total amount of the mixture of $Na_2O$ and at least one of $Li_2O$ and $K_2O$ is assumed to be 100% by weight, the amount of $Na_2O$ is at least 45% by weight, that of $Li_2O$ is not more than 25% by weight and that of $K_2O$ is not more than 50% by weight), and
    7–42 parts of an auxiliary component consisting of not more than 12 parts of $Al_2O_3$, 1–22 parts of at least one of CaO, BaO, ZnO, MgO and SrO (provided that the amount of each oxide is not more than 12 parts), from more than 0 part to 7 parts of $MoO_3$ or a mixture of $MoO_3$ and at least one of $V_2O_5$, $P_2O_5$ and $Sb_2O_3$, and 0.5–10 parts of at least one of CoO, NiO, CuO, $MnO_2$ and $Fe_2O_3$.

2. A porcelain enamel frit according to claim 1, wherein the amount of the auxiliary component is 11–37 parts by weight based on 100 parts by weight of the amount of the main component.